Patented Feb. 1, 1927.

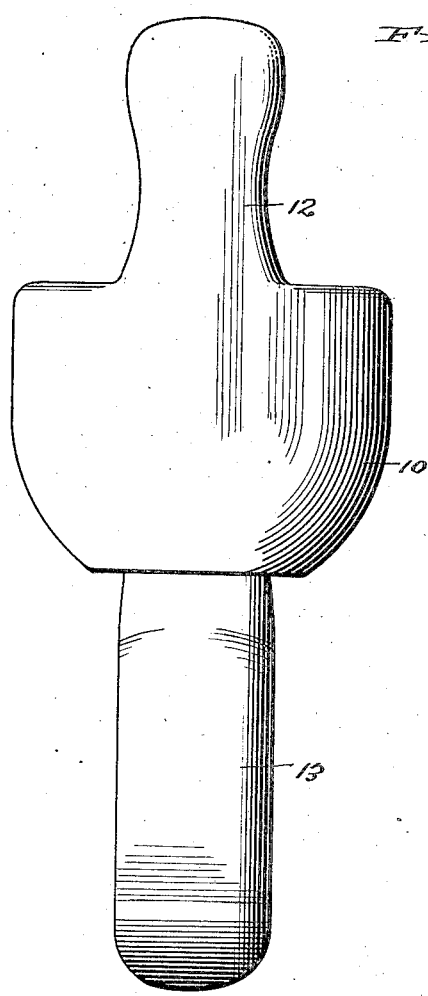
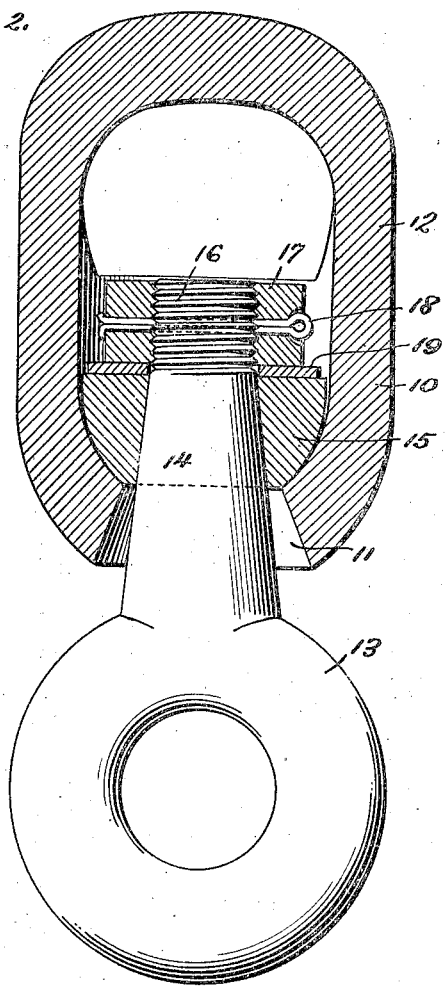

1,616,325

UNITED STATES PATENT OFFICE.

HERBERT FORREST MINSTER, OF FERNWOOD, IDAHO.

SWIVEL.

Application filed October 4, 1924. Serial No. 741,726.

It is the purpose of this invention to provide a swivel possessing absolute freedom of motion, and wherein the respective members are susceptible of both rotary and rocking movements, and associated in a manner to afford the swivel maximum strength and to also allow any of the component parts of the structure to be removed and replaced by new parts should the occasion require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the swivel forming the subject matter of the present invention.

Figure 2 is a vertical sectional view taken at a right angle to Figure 1.

The respective members of the swivel are constructed in a manner clearly illustrated in Figure 2, wherein it will be noted that one of these members is formed with a bowl like portion 10 having a central opening 11 in the bottom thereof, the wall of said opening being tapered as clearly illustrated in Figure 2. Also forming part of this member is a link 12 which projects from the open end of the bowl like portion 10. The other member of the swivel includes a ring or eye 13 which is carried by one end of a tapered shank 14 which is adapted to be passed through the opening 11 in the bowl portion 10 above referred to. The interior of this bowl like portion is rounded to accommodate the semi-spherical shape member 15 which is formed with a central opening to receive the shank 14 and adapted to repose upon the bottom of the bowl like portion 10. The shank is threaded adjacent its free end as at 16 to receive a nut 17, and passed through this nut and shank is a cotter pin 18 to hold the parts operatively associated. Interposed between the semi-spherical member 15 and the nut 17 is a washer 19. Manifestly, the swivel in its entirety is not only simple in construction, but the parts are so associated that they can be quickly and conveniently assembled or disassembled as the occasion may require, especially when it is necessary to replace any part with a new part. Then again in addition to the members having the usual rotary motion, the members are allowed a rocking movement, which affords the swivel that freedom of motion desirable in devices of this kind.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

In a swivel, a member including a lower bowl like portion and an upper inverted U-shaped portion, said bowl like portion having a centrally located circular opening, the walls of which are tapered, a tapered shank passed through the opening, smooth for a major portion of its length and threaded at its inner end, a semi-spherical shaped member having a central opening to receive said shank and arranged about the smooth portion thereof, said spherical member being of a size to occupy approximately one-half of said bowl like portion, reposing on the bottom thereof and slightly spaced from the side walls thereof, a nut threaded on the inner end of said shank, a pin passed through the nut and shank, whereby said members are associated for both locking and rotary movement, and a ring carried by the lower end of said shank for the purpose specified.

In testimony whereof I affix my signature.

HERBERT FORREST MINSTER.